Patented Nov. 22, 1938

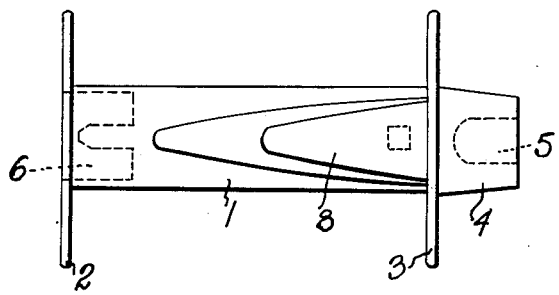
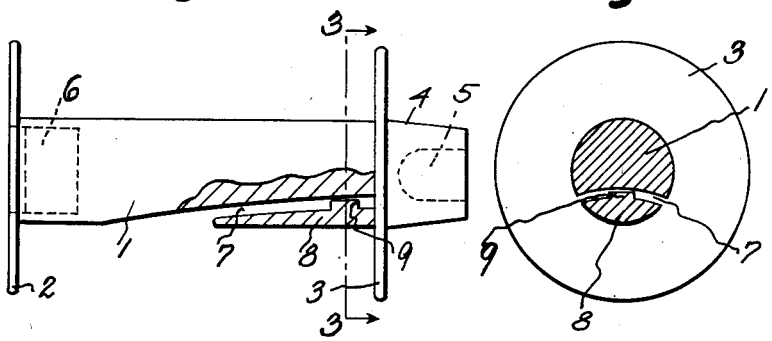
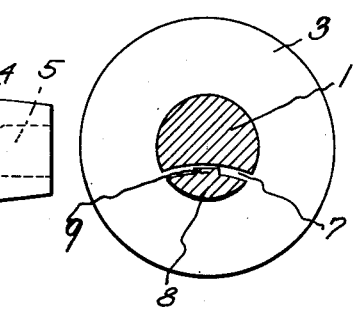

2,137,502

UNITED STATES PATENT OFFICE 2,137,502

FILM SPOOL FOR PHOTOGRAPHIC CAMERAS

Hubert Nerwin, Dresden-Seidnitz, Germany, assignor to Zeiss Ikon Aktiengesellschaft, Dresden, Germany Application October 8, 1937, Serial No. 168,065
In Germany October 6, 1936

6 Claims. (Cl. 242—74)

This invention relates to improvements in film spools for photographic cameras.

It is an object of the invention to provide a film spool into which the end of the film or leader attached thereto may be more readily inserted than in the film spools in use at the present time.

Most of the film spools in use are provided with a body of cylindrical shape having a transverse slit in a plane parallel to the axis of the body. The insertion of the end of the film into this slit had been difficult, particularly in the dark-room, and it had been customary to trim down the end of the film to make the insertion somewhat easier. This reduction of the film in width obviously could be carried out solely by sacrificing a portion of the film which otherwise would have been available for pictures. The loss is especially noticeable in films for miniature cameras as they have become very popular recently. This reduction of the film in width by scissors or the like also had to be carried out in the dark-room, and hence also was an operation which the average camera user could not perform very readily.

The present invention has the object of eliminating the necessity of trimming the end and of threading the film through a transverse slit.

The object of the invention may be described as providing a holding tongue equidistantly spaced from the main portion of the film body, but shorter than the latter, to permit insertion of the film transversely to its length into the interspace.

The invention also has the object of providing a film spool with a body having a slit which opens longitudinally of the body at one end, permitting thereby at the open end the insertion of the film transversely to the length of the film.

Another object of the invention is to facilitate the insertion of the film by providing a slit which in its entirety extends at a slight angle to the axis of the spool body and opens into the circumference of the body along an uninterrupted line extending from one end of the slit to the other.

It is, furthermore, an object of the invention to provide a spool for perforated films in which the slit itself is equipped with means for locking the film in position.

With these and numerous other objects in view, an embodiment of the invention is illustrated in the accompanying drawing to which reference is made in the following specification.

In the drawing:

Fig. 1 is a side elevation of the film spool;

Fig. 2 is partly front elevation and partly section, and

Fig. 3 is a sectional view on line 3—3 of Fig. 2.

The film spool comprises a body 1 made of suitable material and having flanges 2 and 3 which are spaced from each other a distance corresponding approximately to the width of the film, not shown in the drawing. This film spool may have at one end an extension 4 with a coupling socket 5 for the driving mechanism (not shown) and may be provided at the other end with a socket 6 in which a key for positioning the film spool may be located.

The main portion of the body 1 is spaced from a tongue 8 which extends from one end of the body to a point short of the opposite end, thereby leaving between the main portion of the body 1 and the tongue 8, a slit 7. As shown in the drawing this slit is inclined somewhat to the axis of the body to make it easier to push the film into the slit transversely to the film.

Owing to this arrangement the film does not have to be threaded transversely through the body but may be inserted substantially longitudinally of the body from the open end of the slit 7 so as to project from opposite sides of the same, whereupon by rotation of the body, the film may be firmly wound thereon in the ordinary way. This insertion substantially longitudinally of the body may be carried out in complete darkness much more easily than the threading operation involving the passage of the end of the film or leader transversely through the body.

An additional means may be provided in the interior of the slit for holding the film end in position. Many films in use at the present time, especially films for miniature cameras, are provided with marginal rows of sprocket holes. At least, one of the walls of the slit 7 is shown to have a projecting lug 9 of a size to engage a sprocket hole of the film, not shown, whereby the film is adapted to lock itself in position against longitudinal movement in either direction.

The arrangement of this slit does not require a reduction of the ends of the film for insertion. The user also avoids the risk of inserting the film at an angle to its longitudinal axis—a danger which was present whenever a reduced portion of the film was threaded in darkness through a transverse slit.

In Fig. 3 this slit 7 is shown as extending along an arcuate line through the body 1 of the spool. This is of advantage, but it is obvious that this transverse curvature of the slit is not essential. The arrangement of a tongue extending in spaced relation from one end of the body to a point remote from the other end will provide a slit into which the film may very easily be pushed in a direction longitudinal to the axis of the body.

While the drawing shows and the specification describes a preferred embodiment of this invention, the latter is not to be limited to any of the details shown herein, and many other modifications may suggest themselves as being within the scope of the appended claims.

I claim:

1. A film spool having a body provided with axially spaced flanges and a slit for the insertion of the film, said slit extending at an angle to the axis of rotation of the body, starting at the circumference of said body between said flanges and terminating at one of said flanges, and means extending into said slit adjacent said last named flange for engaging a hole of the film inserted in said slit.

2. A film spool having a body provided with axially spaced flanges and a slit for the insertion of the film, said slit extending at an angle to the axis of rotation of the body without intersecting said axis of rotation, starting at the circumference of said body between said flanges and terminating at one of said flanges, and means extending into said slit adjacent said last named flange for engaging a hole of the film inserted in said slit.

3. A film spool having a cylindrical body provided with axially spaced annular flanges and a slit for the insertion of the film, said slit extending at a slight angle to the axis of rotation of the spool and being arranged completely on one side of said axis, starting at the circumference of the body between said flanges and terminating at one of said flanges, and a projection extending into said slit at a right angle to the axis of said body and adjacent said last named flange for engaging a hole of the film inserted in said slit.

4. A film spool having a cylindrical body provided with axially spaced annular flanges and a slit for the insertion of the film, said slit extending at a slight angle to the axis of rotation of the spool and being arranged completely on one side of said axis, starting at the circumference of the body between said flanges and terminating at one of said flanges, so as to form from a portion of said cylindrical body a tongue-shaped member supported by one of said flanges and separated from the other portion of said cylindrical body by said slit, and a projection extending from said tongue-shaped member adjacent its supporting flange into said slit for engaging a hole of the film inserted in said slit.

5. A film spool having a cylindrical body provided with axially spaced annular flanges and a slit for the insertion of the film, said slit extending at a slight angle to the axis of rotation of the spool and being arranged completely on one side of said axis, starting at the circumference of the body between said flanges and terminating at one of said flanges, so as to form from a portion of said cylindrical body a tongue-shaped member supported by one of said flanges and separated from the other portion of said cylindrical body by said slit, and a projection extending from said tongue-shaped member adjacent its supporting flange into said slit but remaining spaced from the opposite portion of said cylindrical body for engaging a hole of the film inserted in said slit.

6. A film spool having a cylindrical body provided with axially spaced annular flanges and a slit for the insertion of the film, said slit extending at a slight angle to the axis of rotation of the spool and being arranged completely on one side of said axis, starting at the circumference of the body between said flanges and terminating at one of said flanges, so as to form from a portion of said cylindrical body a tongue-shaped member, and a projection on the inner face of said tongue-shaped member adjacent said last named flange for engaging a hole of the film inserted in said slit.

HUBERT NERWIN.